United States Patent [19]

Baumeister

[11] Patent Number: 4,547,056

[45] Date of Patent: Oct. 15, 1985

[54] DIGITAL CIRCUIT WITH IMPROVED INPUT/OUTPUT CONNECTIONS

[75] Inventor: Hans-Peter Baumeister, Churchville, N.Y.

[73] Assignee: Eastman Kodak Company, Rochester, N.Y.

[21] Appl. No.: 671,396

[22] Filed: Nov. 15, 1984

[51] Int. Cl.⁴ .................. G03B 17/00; H04B 12/00
[52] U.S. Cl. .................. 354/412; 340/825.63; 340/870.14
[58] Field of Search .......... 354/412; 340/365 S, 340/825.63, 870.14

[56] References Cited

U.S. PATENT DOCUMENTS

| | | | |
|---|---|---|---|
| 3,776,112 | 12/1973 | Wilwerding | 95/10 |
| 3,887,277 | 6/1975 | Tepper | 353/103 |
| 4,047,155 | 9/1977 | Miller | 340/147 |
| 4,320,518 | 3/1982 | Ichiyanagi | 375/17 |
| 4,325,623 | 4/1982 | Suzuki et al. | 354/289 |
| 4,401,373 | 8/1983 | Nakai | 354/23 |

*Primary Examiner*—William B. Perkey
*Attorney, Agent, or Firm*—David M. Woods

[57] ABSTRACT

In connecting a microprocessor to several condition-sensitive switches and several slow-reacting loads such as motors and solenoids, the input/output ports of the microprocessor may be simplified and reduced in number by incorporating a switch and a load on the same output port. Each load is connected to a separate output port. Each switch is also connected between an output port (which is also connected to a load) and a common input port. The switches are interrogated by a time-divided stream of pulses, each pulse being too short to noticeably affect the operation of any load. The closure of a switch is noted by detecting, at the input port, the presence of any pulses that passed through the closed switch.

10 Claims, 4 Drawing Figures

DIGITAL CIRCUIT WITH IMPROVED INPUT/OUTPUT CONNECTIONS

BACKGROUND OF THE INVENTION

1. Field of the Invention

The invention pertains to connections to and from a digital circuit and, in particular, to input/output connections between a microprocessor and peripheral control devices used in photographic and video cameras.

2. Description Relative to the Prior Art

A microprocessor typically has a considerable number of signal-carrying ports devoted to input and output connections with peripheral devices. For example, in the case of a microprocessor-controlled camera, various solenoids (for releasing the shutter, controlling the diaphragm aperture, and the like) and various switches (for signalling the beginning of light measurement and shutter release, and the like) are connected to corresponding input and output ports of a microprocessor (see, for example, the connections to the microprocessor in the camera disclosed in U.S. Pat. No. 4,401,373). Ordinarily, each port corresponds to a connecting pin on an integrated circuit chip which bears the microprocessor. With many ports, therefore, there are many pins.

Large numbers of pins are not cost-effective since each additional pin represents additional cost in the manufacture of the microprocessor integrated circuit, additional labor in the connection of the pin to a peripheral device, and decreased reliability due to the additional connection. The numbers of pins can be reduced if the ports are made bidirectional, that is, capable of accommodating both incoming and outgoing exchanges with a peripheral device. Compared to a unidirectional port, however, a bidirectional port requires a more complex microprocessor architecture since the direction of the port has to be internally specified and implemented via additional internal digital processing elements.

SUMMARY OF THE INVENTION

The invention provides a way of reducing the number of required ports (i.e., reducing the number of pins) on a microprocessor without correspondingly increasing its internal complexity. The invention particularly applies to microprocessor-controlled equipment that utilizes switches which must be periodically interrogated and slow-reacting devices which receive power from a microprocessor-controlled circuit. The power-consuming devices are electrical loads such as motors and solenoids which have sufficient mechanical and electrical inertia to resist sudden changes (i.e., they tend to remain "on" . . . though momentarily turned "off" . . . or "off" . . . though momentarily turned "on".) The benefits of the invention also obtain if the electrical load is a display element, such as a light-emitting diode, which merely "appears" to be slow-reacting (i.e., the diode appears to remain "on" . . . though momentarily turned "off" . . . or appears to be "off" . . . though momentarily turned "on").

According to the invention, a slow-reacting load and a switch are both connected to a common, unidirectional output port of a microprocessor. In order to handle both devices, a drive signal and a periodic interrogation signal are produced by the microprocessor and presented at the common output port as a composite signal. The drive signal operates the slow-reacting load and the interrogation signal causes the periodic interrogation of the switch at predetermined intervals. By making the duty cycle of the periodic interrogating signal very short (say, 1/20 to 1/40 of its idle time), the switch can be interrogated during a very short interval without affecting the condition of the slow-reacting load (whether it is operating or not). When the load needs to be driven, the drive signal is produced and is superimposed on the periodic signal. Nonetheless, interrogation is still effected at the predetermined intervals by the "on" state of the drive signal. The condition of the switch, i.e., open or closed, is signalled back to the microprocessor through a separate unidirectional input port during the short interval of interrogation. Such a composite signal avoids a bidirectional input/output port, permitting simplified connections where one port is devoted to several output signals and another port is devoted to the input signal.

When several loads and several switches are controlled by the microprocessor in this manner, an additional benefit obtains. If each switch is teamed with a load and, by time division of the respective interrogation signals, if all switches are connected to a common input port, the pin requirement is proportionately reduced. That is, two loads and two switches require three ports, (instead of four) four loads and four switches require five ports (instead of eight), and so on. The use of the common input port means that, when interrogating the condition of a switch on one output port, every other output port must be momentarily "off" for the short period required for the interrogation. This period is too short to affect the condition of any load, whether operating or not.

BRIEF DESCRIPTION OF THE DRAWINGS

The invention will be described with reference to the figures, wherein.

DETAILED DESCRIPTION OF THE PREFERRED EMBODIMENT

Because microprocessors and microprocessor-controlled cameras are well-known, the present description will be directed in particular to elements forming part of, or cooperating more directly with, apparatus in accordance with the present invention. Elements not specifically shown or described herein may be selected from those known in the art.

Figure 1:
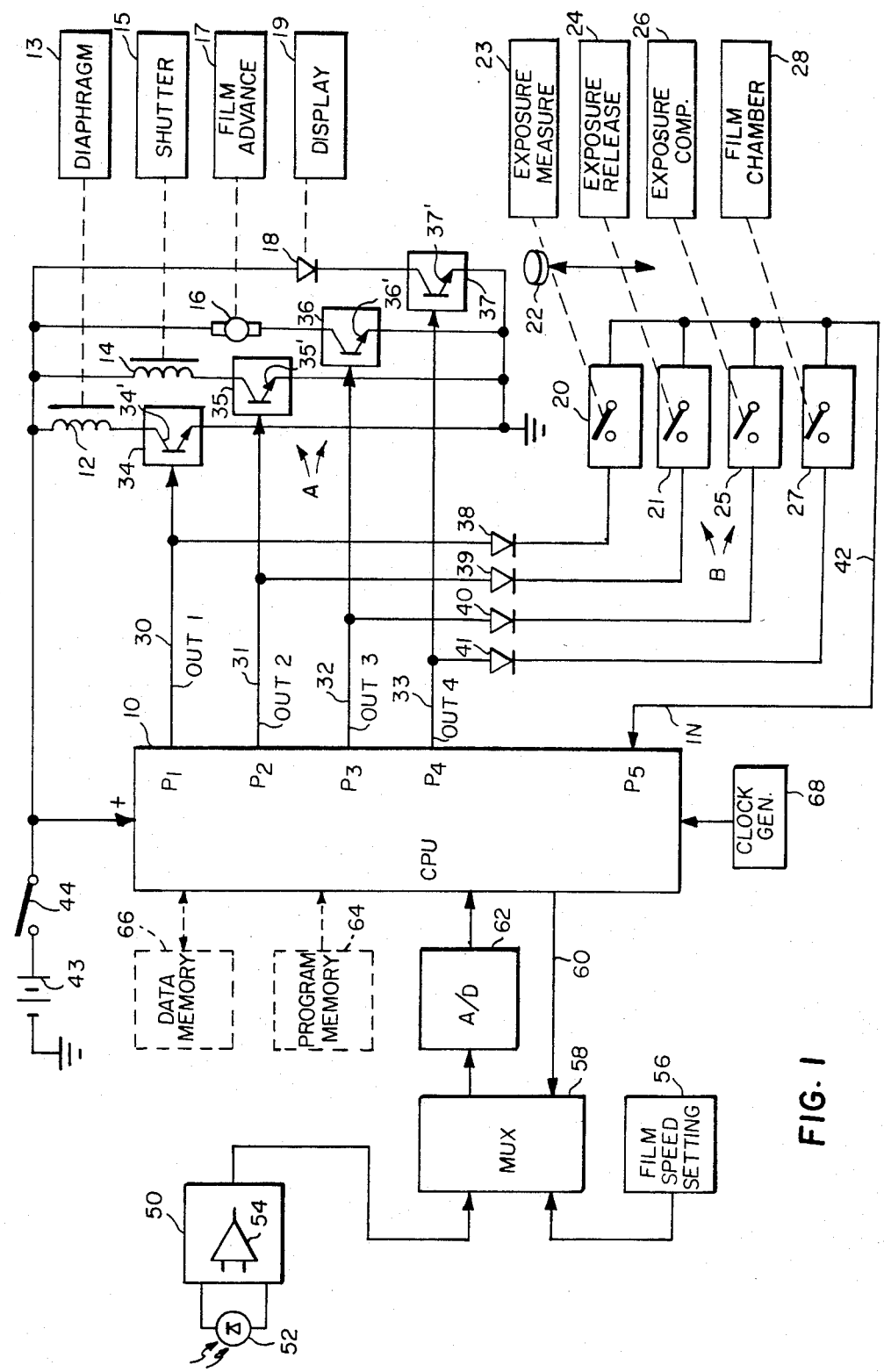
FIG. 1 is a circuit diagram showing a camera control circuit arranged according to the invention.

FIG. 1 shows a microprocessor-controlled circuit for a photographic camera. In particular, a microprocessor 10 is used to control an array A of slow-reacting devices and to sense the condition of an array B of switches. (The slow-reacting devices are electrical loads to which power is delivered and, as such, they will be hereinafter referred to as loads.) The array A of loads includes a solenoid 12 for operating a diaphragm 13 which limits the camera lens aperture, a solenoid 14 for operating a camera shutter 15 which permits light to strike photographic film (not shown), a motor 16 for operating an automatic film advance mechanism 17 which automatically winds the film after each exposure, and a light-emitting diode 18 for producing a display 19 in, say, the viewfinder of the camera. The particular functions ascribed to these loads are exemplary of conventional camera functions. The array B of switches include switches 20 and 21 coupled to a shutter release button 22 mounted on the camera. Pushing the shutter release button 22 part-way closes the switch 20, which initiates an exposure measurement procedure 23 in the microprocessor 10. Pushing the shutter release button 22 all the way closes the switch 21, which signals the microprocessor 10 to begin an exposure release procedure 24 (by setting the diaphragm 13 and opening the shutter 15 to expose the film in the camera). A further switch 25 is sensitive to the condition of an exposure compensation adjustment 26 (e.g., a "light-dark" slider switch on the camera). Another switch 27 is internally mounted within the film chamber 28 of the camera in order to sense the presence of a cartridge or cassette (not shown) in the camera. These switches, and their functions, are exemplary of conventional condition-sensitive sensors in a camera.

Each load is placed in operation by conducting a substantially continuous driving current through it. Nonetheless, a brief interruption in the driving current is essentially "unseen" by the load. These loads are consequently considered slow-reacting in that (A) once they are operating, a very brief interruption in the driving current will not cause a noticeable change in their operation and (B) when they are not operating, a very brief pulse of current will not cause a noticeable operation. In the case of the solenoids 12 and 14 and the motor 16, the insensitivity to brief interruptions is due to the mechanical and electrical inertia of the devices. That is, it takes awhile for the electric and magnetic fields of the devices to build up, or collapse, and the mechanical inertia of the devices tends to resist any change. A brief interruption, or pulse, is essentially "unseen" by the device. In the case of the LED 18, a brief interruption in the light output from the LED 18 will not be noticed by a human observer. For the same reason, a brief pulse of light will not be seen.

The microprocessor 10 has five unidirectional input and output ports P1–P5 dedicated to the arrays A and B of loads and switches. Four output ports, P1–P4 are connected by respective lines 30, 31, 32 and 33 to a set of current drivers 34, 35, 36 and 37 and, by respective branching lines, to a set of isolation diodes 38, 39, 40 and 41. Each driver 34, 35, 36 and 37 is connected to a respective load, that is, to the solenoids 12 and 14, to the motor 16, and to the LED 18. Each isolation diode 38, 39, 40, and 41 is connected to a respective switch 20, 21, 25 and 27. Due to these connections, each output port P1–P4 services one of the loads 34, 35, 36 and 37 and one of the switches 20, 21, 25 and 27. (The function of a switch does not need to be related to the load it is teamed with.) The switches 20, 21, 25 and 27 are connected back to a unidirectional return (input) port P5 on the microprocessor 10 by a common return line 42.

The current drivers 34, 35, 36 and 37 comprise suitable current switching devices, such as transistors 34', 35', 36' and 37'. The transistors, when conducting, connect the respective loads between ground and a suitable power source, such as a battery 43 (after a switch 44 is manually closed in order to connect battery power to the circuit). The resulting current drives each load and causes the associated device to operate. The isolation diodes 38, 39, 40 and 41 are used to isolate the switches 20, 21, 25 and 27 from the output lines 30, 31, 32 and 33. Were it not for such diodes, the closure of two switches at the same time would complete a circuit between two output lines and, if the load on one line is being operated, cause the load on the other line to operate as well.

In order that the shutter 15 and the diaphragm 13 can control exposure as a function of ambient light, a light-level measuring circuit 50 provides an output voltage proportional to the intensity of ambient light striking a photodiode 52. The photodiode 52 is connected in a conventional manner to an operational amplifier 54. A film speed setting circuit 56 provides an output voltage proportional to the manually set speed of the particular film being used. The film speed setting circuit 56 is conventional; it may be, for example, a resistance that varies according to user adjustment. The analog output voltages from the light-level measuring circuit 50 and the film speed setting circuit 56 are provided to a multiplexer 58. When an enable signal is received from the microprocessor 10 on a line 60, the multiplexer 58 transfers the analog voltage signals one after the other to the analog-to-digital (A/D) converter 62. The digital output of the A/D converter 62 is entered into the microprocessor 10 for processing. The programs for exposure calculation, for operating the solenoids 12 and 14, the motor 16 and the LED 18, and for interrogating the switches 20, 21, 25 and 27 are contained in a program memory 64. Data is stored in a random-access memory (RAM) 66. Preferably the memories 64 and 66 are included on-board the integrated circuit chip bearing the microprocessor 10 (which is why they are shown by broken line). Timing pulses for controlling the operation of the microprocessor 10 are provided by a clock generator 68.

Figure 2:
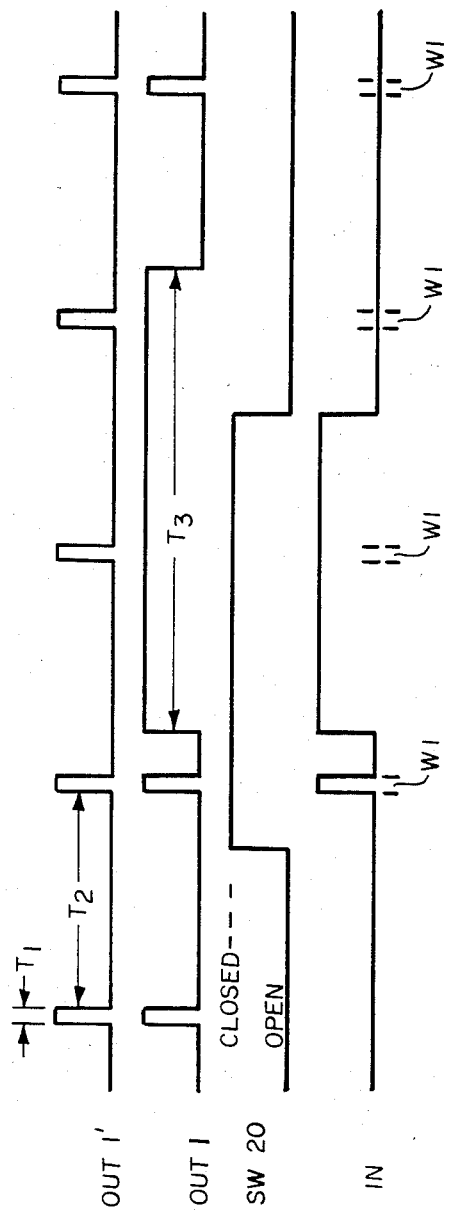
FIGS. 2, 3 and 4 are timing diagrams useful in explaining the operation of a pertinent part of the circuit diagram of FIG. 1.
Figure 3:
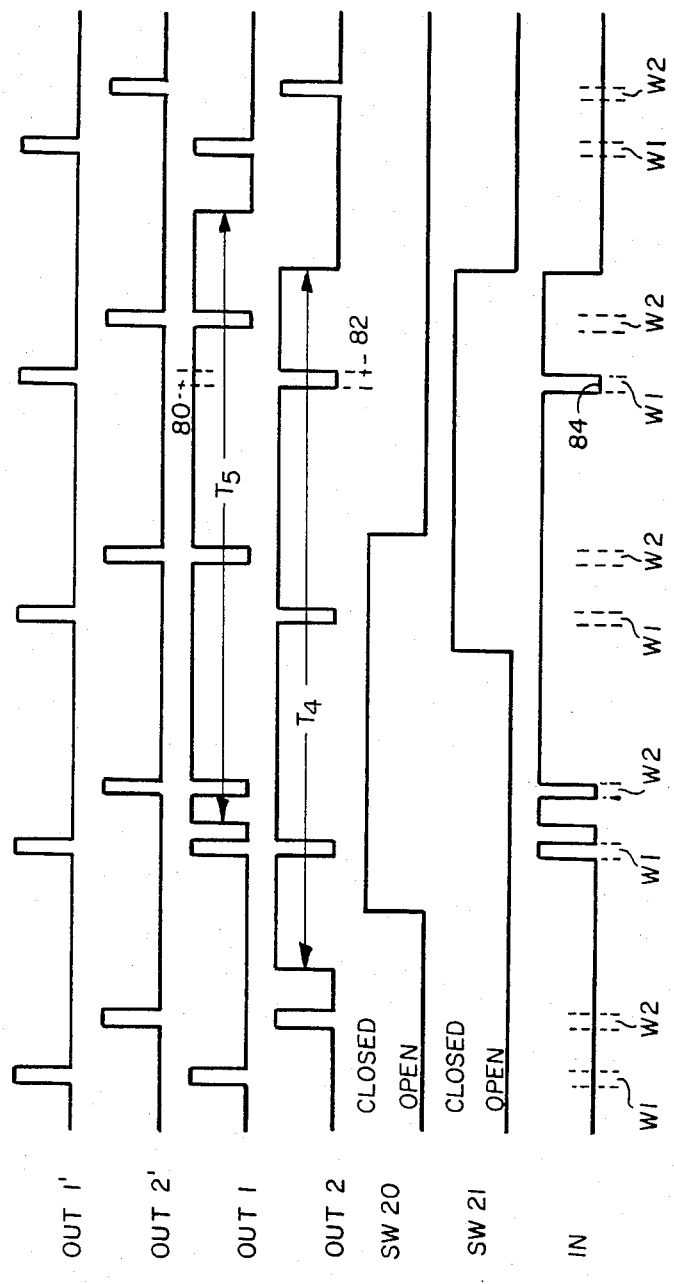
Figure 4:
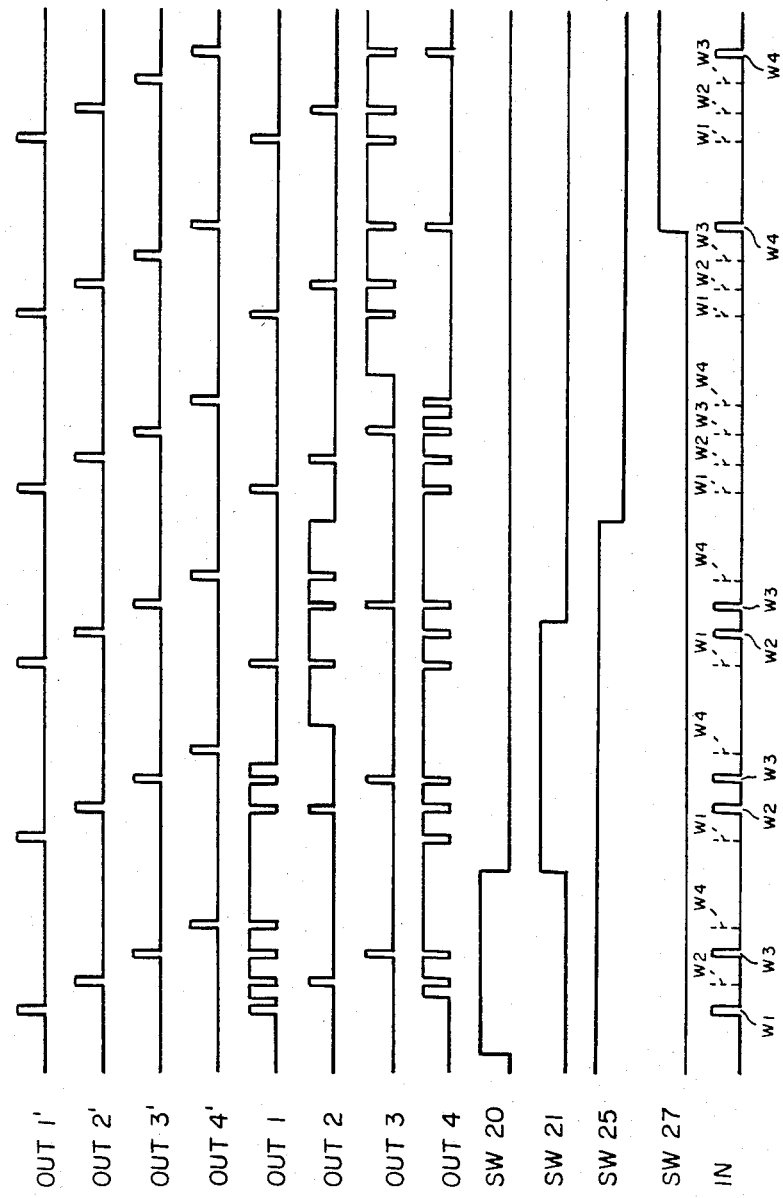

The operation of the invention is best understood in connection with the timing diagrams of FIGS. 2, 3 and 4. These diagrams show, in order of increasing complexity, the signals appearing at one or more output ports P1–P4, at the input port P5 and the state of one or more of the switches 20, 21, 25 and 27. FIG. 2 is useful for understanding what happens if there is only one load (solenoid 12) connected via one line (line 30) to one output port (port P1). In addition, one switch (switch 20) is also connected to the same output line and output port. The signal OUT 1' represents a periodic pulse train presented at output port P1 and used to interrogate the condition of the switch 20. The duration $T_1$ of the pulse is very short (e.g., 50 microseconds) compared to the idle time $T_2$ (e.g., 2 milliseconds) between pulses. If the ratio of pulse period to pulse duration is on the order of 20–40 (i.e., a very short duty cycle) then the pulse on the line 30 will not interfere with the operation of the solenoid 12, yet will serve to interrogate the switch 20. In this connection, it is noted that the pulse widths are greatly exaggerated in FIGS. 2, 3 and 4 for sake of illustration.

The signal waveform OUT 1 diagrammed in FIG. 2 shows a driver pulse (produced by the microprocessor 10 pursuant to control by the memories 64, 66) superimposed on the pulse train OUT 1' such that the solenoid 12 will be operated during the period $T_3$. The composite signal OUT 1 appears at the output port P1. The driver pulse drives the base of the transistor 34' positive, thereby causing it to conduct. A closed circuit is formed through which current flows through the solenoid 12 and causes operation of the diaphragm 13. The next waveform SW20 illustrates the state of the switch 20 during the production of the waveform OUT 1. The signal on the return line 42 is shown by the waveform IN. Note that in the return waveform IN there are short periods labelled W1 which serve as "windows" during which the status of the switch 20 is interrogated. If the return waveform IN is high during a window, it means that the switch 20 is closed and conducting; if the return waveform is low during a window, it means that the switch 20 is open. The interrogation of the switch 20 is effected by either the pulse train or the OUT 1 driver pulse, as follows. A pulse from the signal train OUT 1' enables the waveform IN to be high during some window periods and the OUT 1 driver pulse enables the waveform IN to be high during the other window periods. With the switch 20 open during a window period W1, the circuit including the return line 42 is not completed to the microprocessor 10 and nothing appears at the input port P5. (The condition of waveform IN is only of interest during the window W1 period.) The high state during a window W1 on the return waveform IN signifies to the camera the occurrence of a certain condition, e.g., the request to initiate an exposure measurement. In the meantime, the operating condition of the load connected to the port P1 is unaffected, i.e., the solenoid 14 remains either on or off. It is of particular note that the operation of the load does not have to have any relationship to the condition of the switch; that is, the closure of the switch may be unpredictable with respect to the operation of the load.

FIG. 3 introduces the next level of complexity with two switches 20 and 21 connected to the output lines 30 and 31. The signal waveform OUT 2' appears on the output port P2 as a periodic train of pulses that are time-separated from the pulses appearing as waveform OUT 1'. The waveform OUT 2 shows the combination of the pulse waveform OUT 2' with a driver pulse of interval $T_4$ (waveform OUT 1 is shown with a driver pulse of interval $T_5$). Since there are two switches 20 and 21 that require interrogation at set times, there are two sets of windows W1 and W2 related to the waveform IN. The window W1 corresponds to the state of the switch 20 and the window W2 to the switch 21. The added complexity is as follows: For the state of the switch 20 to be examined during a window W1, the waveform OUT 2 must be programmed to be momentarily set low during this short period of interrogation. Otherwise, if waveform OUT 2 is high (that is, the solenoid 14 is being operated), it could never be known for certain whether switch 20 or switch 21 was closed. For example, the interval 80 in waveform OUT 1 corresponds in time to the window W1. Switch 20 is open. By setting the waveform OUT 2 low during the interval 82, the state of waveform IN is correctly set low during this period (interval 84). If the waveform OUT 2 had remained high during this interval, the waveform IN would be high and represent, incorrectly, the state of switch 21 rather than switch 20. The same line of reasoning applies to switch 21. That is, for the state of switch 21 to be interrogated during window W2, the waveform OUT 1 must be momentarily set low during the period of interrogation. (As in the case of FIG. 2, the state of the waveform IN between window periods is not of interest as it depends on the state of both switches 20 and 21).

FIG. 4 is a waveform diagram showing the signal waveforms appearing on the four output ports P1-P4 as shown by FIG. 1. The state of the four switches 20, 21, 25 and 27 are also shown as waveforms SW20, SW21, SW25 and SW27. The waveform for the return signal IN is shown with four sets of windows W1, W2, W3 and W4. Each window represents the interrogation interval for a respective switch (the broken line indicates the presence of a window but the absence of a return signal, i.e., the switch is open; furthermore, the state of the waveform IN between window periods has been omitted for sake of simplicity.) The high state of waveform SW20 represents the part-way depression of the shutter button 22 (exposure measurement) while the immediately succeeding high state of waveform SW21 represents the full depression of the button 22 (exposure release). Meanwhile a nominal exposure compensation has been called for (the high state of waveform SW25). Finally, after the last frame is wound on, and the film is removed from the camera, SW27 goes high (obviously, more time than shown would have to elapse to effect the necessary manual operation). In all other respects, the timing diagram of FIG. 4 may be interpreted the same as the waveforms of FIG. 3.

The microprocessor 10 is instructed as to what to do by programming it with a series of instructions which are stored in the program memory 64. The microprocessor fetches these instructions one at a time and performs the corresponding operation. Most of the program for the camera control system of FIG. 1 will be devoted to camera operations that form no part of this invention. The waveforms OUT 1', OUT 2', OUT 3' and OUT 4' (FIG. 4) are simple periodic waveforms that are produced at recurring intervals by simple instructions. The timing for these waveforms is provided by an internal timer or, if necessary, by an external timer. The driving voltages that are superimposed on the periodic waveforms (resulting in waveforms OUT 1, OUT 2, OUT 3 and OUT 4) originate from other parts of the camera control program, parts that are entirely conventional and not of particular interest to a description of this invention. The returning signal on the line 42 is received by simple instructions and analyzed during the respective windows, again with the assistance of an internal (or external) timer. All progamming, whether to generate and receive waveforms in FIG. 4 or to generally operate the camera, is entirely conventional and fully within the capability of anyone of ordinary skill in programming.

Although the invention has been disclosed for use with a photographic camera, it is apparent that it may be used with a video camera, a movie camera or any microprocessor-controlled equipment employing slow-reacting loads and condition-sensitive sensors, such as switches. Furthermore, though four loads and four switches have been described, any number may be specified within the capability of the microprocessor. If only one load and one switch are teamed up in this way, then an isolation diode is not necessary. In the preferred embodiment the closure of one of the switches is determined by detecting, at the input port P5, the presence of one or more of the pulses from the periodic pulse train shown, e.g., as the waveform OUT 1' in FIG. 2. The invention could also be practiced by doing just the reverse. That is, the switches could be normally closed, thus passing the pulse train. Then the opening of one of the switches is determined by detecting the omission of one or more expected pulses.

While any kind of microprocessor can be used, the invention especially lends itself to a custom design where the cost reduction in fewer pins and the simplicity of unidirectional input and output can be fully realized. Moreover, the recitation of a microprocessor is meant to include any kind of central processing unit (CPU) that is able to implement the required procedures.

The invention has been described in detail with particular reference to a presently preferred embodiment thereof, but it will be understood that variations and modifications can be effected within the spirit and scope of the invention.

What is claimed is:

1. A circuit for operating an electrical device and for receiving a signal from a switch whenever it is actuated, the switch being of the type that interrupts circuit continuity between two terminals, said circuit comprising:
 a processor having an output port for sending an output signal and an input port for receiving an input signal;
 means for connecting the electrical device to said output port;
 means for connecting one terminal of the switch to said output port and the other terminal of the switch to said input port;
 means connected to said output port for generating a stream of interrogating pulses for determining the status of the switch, said pulses being of such duration as not to cause a noticeable change in the operation of the electrical device; and
 means connected to said input port for detecting the actuation of the switch by observing the state of the input signal returned to said processor through said input port.

2. A circuit as claimed in claim 1 wherein said means connected to said input port for detecting the actuation of the switch comprises means for detecting the presence of one or more of said interrogating pulses at said input port.

3. A circuit as claimed in claim 1 further comprising means connected to said output port for generating a drive signal that operates the electrical device, said drive signal being superimposed on said stream of interrogating pulses.

4. A circuit as claimed in claim 3 wherein said means connected to said input port for detecting the actuation of the switch comprises means for determining the state of the input signal at predetermined intervals corresponding to the period of said interrogating pulse stream, the state of the input signal during such predetermined intervals depending in part upon the occurrence of said pulses and in part upon the state of said drive signal.

5. A circuit for operating a plurality of electrical devices and for receiving signals from a plurality of switches whenever they are actuated, each switch being of the type that interrupts circuit continuity between two terminals, said circuit comprising:
 a processor having a plurality of output ports for sending output signals and an input port for receiving an input signal;
 means for connecting each of the electrical devices to respective output ports;
 means for connecting one terminal of each switch to one of said output ports and the other terminal of each switch to said input port;
 means for isolating each switch from the electrical device also connected to the same output port, said isolating means permitting output signals to reach the switch from said output port but preventing signals originating elsewhere from passing through the switch and reaching the electrical device also connected to the same output port;
 means connected to said output ports for generating a stream of interrogating pulses for determining the status of each switch, said pulses being of such duration as not to cause a noticeable change in the operation of the electrical devices; and
 means connected to said input port for detecting the actuation of any of the switches by observing the state of the input signal returned to said processor through said input port.

6. A circuit as claimed in claim 5 wherein said means connected to said input port for detecting the actuation of any of the switches detects the actuation of a particular switch by observing the presence of one or more of said interrogating pulses passed to said input port by the closure of said particular switch.

7. A circuit as claimed in claim 5 wherein said means connected to said output ports for generating a stream of interrogating pulses comprises means for generating a separate stream of interrogating pulses for each output port, said pulses in each stream being time-divided from the pulses in any other stream of pulses.

8. A circuit as claimed in claim 7 further comprising means connected to respective output ports for generating drive signals that operate the respective electrical devices, said drive signals being superimposed on said stream of interrogating pulses appearing at respective output ports.

9. A circuit as claimed in claim 8 wherein said means connected to said input port for detecting the actuation of any of the switches comprises means for determining the state of the input signal at predetermined intervals corresponding to the periods of said interrogating pulse streams appearing at respective output ports, the state of the input signal during such predetermined intervals depending upon the occurrence of said pulses and in part upon the state of said drive signals.

10. A control circuit in a camera for (A) operating a plurality of slow-reacting electro-mechanical or electro-optical devices to which power is delivered and (B) for receiving an input signal from a plurality of switches whenever they are actuated due to conditions in the camera, each switch being of the type that interrupts circuit continuity between two terminals, said control circuit comprising:
 a microprocessor having a plurality of output ports through which output signals are passed and an input port through which an input signal is received;
 means for connecting the electro-mechanical or electro-optical devices to said output ports such that each output port is devoted to one device;
 a plurality of current isolation diodes, each diode having its anode connected to a respective output port and its cathode connected to one of the terminals of a respective switch;
 means for connecting the other terminals of the switches in common to said input port;
 means connected to said plurality of output ports for generating a plurality of composite output signals composed of (A) a plurality of pulsed signals for interrogating the status of the plurality of switches and (B) a plurality of drive signals for operating the devices, the pulses of said pulsed signals being of such duration as not to cause a noticeable change in the condition of the devices whether or not they are in operation; and
 means connected to said input port for detecting an input signal originating with the actuation of any switch, said input signal characterized by the occurrence of pulses or drive signals passing through the switches to said input port.

* * * * *